Oct. 30, 1934.                A. Y. DODGE                1,978,698

BRAKE

Filed March 14, 1929

INVENTOR
ADIEL Y. DODGE
BY
*Jos. W. McConkey*
ATTORNEY

Patented Oct. 30, 1934

1,978,698

UNITED STATES PATENT OFFICE 1,978,698

BRAKE

Adiel Y. Dodge, South Bend, Ind., assignor to Bendix Brake Company, South Bend, Ind., a corporation of Illinois Application March 14, 1929, Serial No. 346,823

7 Claims. (Cl. 188—78)

This invention relates to brakes, and is illustrated as embodied in an internal expanding brake for an automobile. An object of the invention is to provide a smoothly-acting brake which will in large measure adjust itself automatically to compensate for variations in the coefficient of friction of the brake lining, traction of wheels, or the like.

In one desirable arrangement this is accomplished by causing one or more of the shoes to anchor against a spring, so that an increase in the coefficient of friction, which ordinarily tends to make the brake grab, will cause the spring to compress and the shoe to draw away from the brake-applying means, thus at least partially compensating for the greater self-energization of the brake. The brake anchor, in its arrangement to include the spring, also embodies substantial novelty in its construction.

The above and other objects and features of the invention, including various novel and desirable structural details, will be apparent from the following description of the illustrative embodiment shown in the accompanying drawing, in which.

Figure 1:
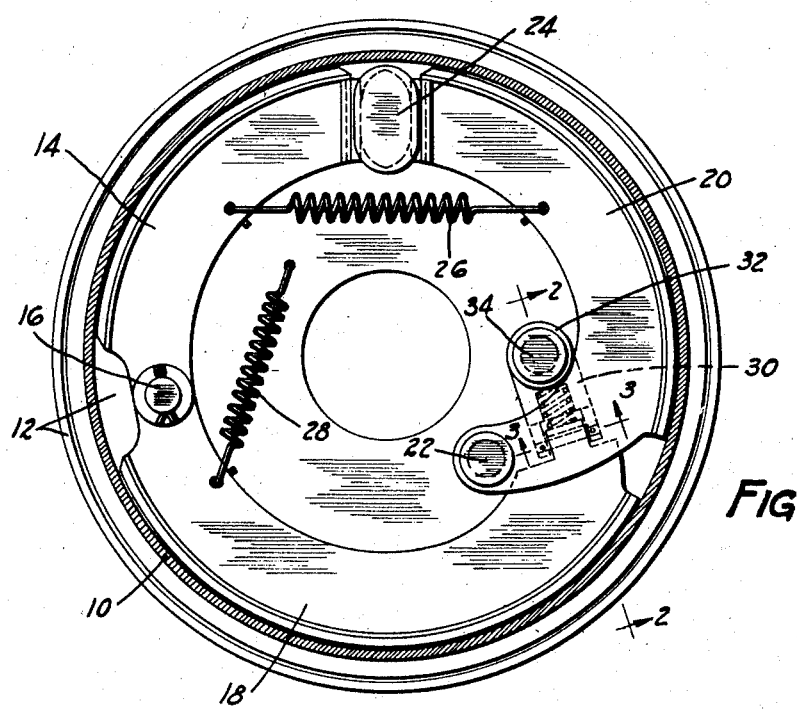
Figure 1 is a vertical section through the brake, just inside the head of the brake drum, and showing the brake shoes in side elevation.
Figure 2:
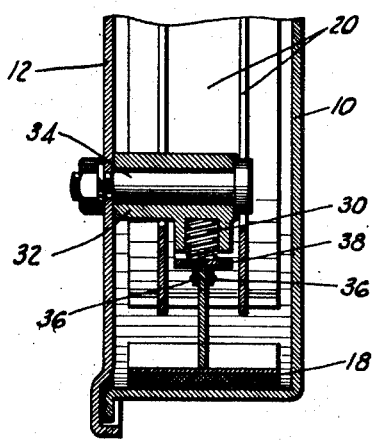
Figure 2 is a section showing the yielding anchorage, on the line 2—2 of Figure 1.
Figure 3:
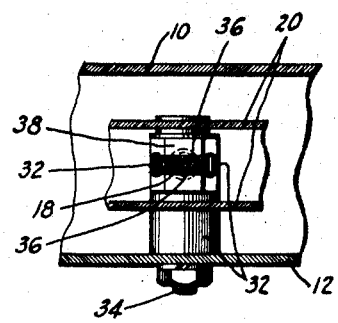
Figure 3 is a section on the line 3—3 of Figure 1, showing how the shoe is guided in its engagement with the spring.

In the arrangement shown, the brake includes a rotatable drum 10, at the open side of which is a suitable support such as a backing plate 12. The illustrated brake includes a primary shoe 14 connected by a floating pivot 16 to an anchored secondary shoe 18, together with an auxiliary shoe 20 pivoted on a fixed anchor 22 carried by the backing plate. The brake is applied by means such as a cam 24 acting against the resistance of return springs 26 and 28. As best appears in Figure 2, shoe 20 has parallel spaced webs, extended at the bottom of the shoe as arms straddling the end of shoe 18 and pivoted on the anchor 22.

Shoe 18 preferably anchors against a coil compression spring 30, forming part of a novel anchor which includes a bushing 32 having in its side a socket receiving the spring 30, and secured to the backing plate by means such as a bolt 34. Bushing 32 is provided, beyond the socket, with a guide comprising spaced parallel strips 36 loosely embracing the end of shoe 18.

Shoe 18 has welded to its end a thrust plate 38 seated against the spring 30.

While one illustrative embodiment has been described in detail, it is not my intention to limit the scope of the invention to that particular embodiment, or otherwise than by the terms of the appended claims.

I claim:

1. A brake comprising, a friction member, and a pivotally mounted cushion anchor therefor.

2. A brake comprising, a backing plate having a pivoted anchor thereon, a friction member, and a spring interposed between one end of the friction member and the anchor.

3. A brake comprising a friction member having a spring seat, a pivoted anchor having a spring seat, and a compression spring confined therebetween.

4. A brake anchor having a socket on one side and a guide beyond the socket, a spring seated in the socket, and a shoe engaged by the guide and seated against the spring.

5. A brake anchor having a socket and a shoe guide beyond the socket.

6. A brake comprising a friction element, an anchor for the friction element, a member pivoted on the anchor having a socket, and a spring seat on the socket engaging the friction element.

7. A brake comprising a friction element, an anchor for the friction element including a member pivoted on the anchor having guides for the reception of the friction element, and a compression member interposed between the friction element and the pivotal member.

ADIEL Y. DODGE.